April 27, 1937.  L. SIMON  2,078,615

DEVICE FOR ADJUSTING PRESSURE RELIEF DEVICES

Filed Dec. 28, 1934

Inventor:
Lucien SIMON
by *Knowles*
Attorneys

Patented Apr. 27, 1937

2,078,615

UNITED STATES PATENT OFFICE 2,078,615

DEVICE FOR ADJUSTING PRESSURE RELIEF DEVICES

Lucien Simon, Paris, France, assignor to Societe d'Exploitation des Brevets Lucien Simon (Amortisseurs Sanchok) (Societe Anonyme), Paris, France Application December 28, 1934, Serial No. 759,599
In France June 7, 1934

2 Claims. (Cl. 64—1)

The object of the present invention is to provide a device for adjusting from a distance a pressure relief device adapted to work in connection with shock absorber pumps for automobile vehicles and other uses.

In my U. S. patent application Ser. No. 759,393, filed Dec. 27, 1934, I have described a pressure relief device mounted in a suitable casing and including, on the one hand an organ for adjusting the position of the seat of the antagonistic spring cooperating with the movable element of the relief device, and, on the other hand an organ for adjusting the position of a stop intended to cause the opening of a discharge valve intended to modify the working conditions of the relief device. The casing above mentioned is provided, opposite the adjusting organs above referred to, with an aperture provided with a removable lid.

It has been found that, in an automobile vehicle fitted with shock absorbers provided with a pressure relief device of this kind and the efficiency of which is controlled by the curve of pressures, it is advantageous to experiment all the oil pressure curves that are possible on the vehicle in service.

The object of the present invention is to provide a removable adjustment device for shock absorbers of this kind characterized in that it includes, on the one hand, a support provided with means for applying it without leakage on the special aperture of the casing above referred to, and on the other hand distinct driving means for the spring adjusting organ and for the organ that serves to adjust the position of the stop cooperating with the discharge valve of the relief device. These driving means are devised in such manner as to come into engagement with the corresponding adjustment organs when the support above referred to is mounted on the casing and they are connected, for instance through flexible shafts, with means for driving them from a distance.

Owing to this arrangement it is possible to adjust the pressure relief device while the vehicle is running and whatever be the position in which said pressure relief device is mounted on said vehicle, the person that makes this adjustment being for instance seated inside the vehicle.

A preferred embodiment of the present invention will be hereinafter described with reference to the accompanying drawing, given merely by way of example, and in which.

Figures 1, 2:
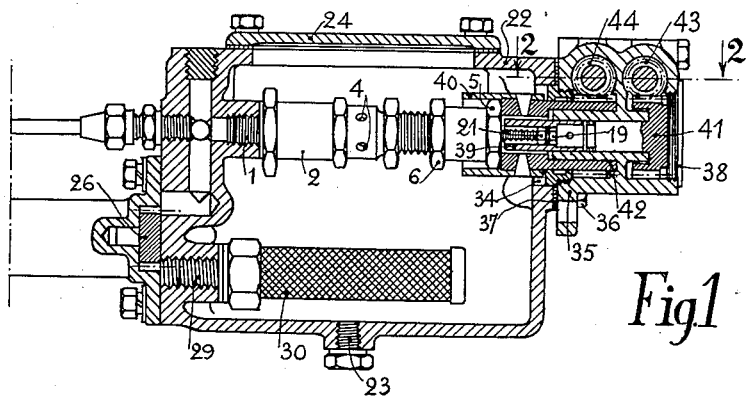
Fig. 1 is a sectional view of an adjustment device according to the present invention mounted on the casing of a pump pressure relief device.
Fig. 2 is a sectional view of the device according to the present invention on the line 2—2 of Fig. 1.

In Fig. 1, 22 designates the casing, which is provided with a discharge plug 23 and with an upper cover 24. The return conduit 1 of a continuous flow pump 26 opens into said casing through the pressure relief device 2 the outlet orifices 4 of which are visible in Fig. 1. This pump draws oil from the casing through filter 30 and pipe 29. 5 is the head of the member on which bears the spring acting on the movable element of the pressure relief device, while 19 is the head of the rod carrying the stop adapted to cooperate with the discharge valve of the pressure relief device. 21 is the nut serving to fix the position of said head on said rod. This nut fits snugly in the polygonal opening in member 39. The cap 6 is screwed on the end of the outer stationary member of the pressure relief device and the rod that carries the stop is screwed in said cap. Casing 22 is provided with a lateral aperture 34 located opposite the adjusting organs above mentioned and normally closed by a lid which is not shown in the drawing. This casing is not permanently attached to the device.

In Fig. 1, the adjustment device is shown as temporarily fixed on the casing in such manner as to close aperture 34 without any possible leakage. Said device includes a support 35 fixed by means of bolts 36 screwed in the holes serving for the fixation of the lid above referred to. Said support 35 is applied against the corresponding wall of the casing with a packing member 37 interposed between the casing and said support. In this support, which forms a kind of small casing closed by a threaded plug 38, are provided two tubular members 39 and 40 of polygonal inner cross section, which are engaged on the heads 19 and 5 above referred to, respectively. These tubular members 39 and 40 are rigid with helical pinions 41 and 42, which mesh with pinions 43 and 44 respectively. Pinions 43 and 44 are connected through turn-screw couplings 45 and 46 with flexible shafts 47, 48, mounted in sheaths 49, 50 respectively. The opposite ends of these sheaths 49, 50 are rigid with bearings 56 fixed on a board 51 by means of nuts 57 screwed on the threaded end 56' of said bearings. The end 54 of each cable or shaft is terminated by a threaded rod 55 on which is screwed a milled knob 52 or 53, a ring 58 of a plastic material, leather for instance, being interposed between said knob and the end of bearing 56. This arrangement is intended to ensure, through the bearing of the leather ring 58 on the end 56" of the bearing, a friction which is sufficient for opposing any accidental displacement of the adjustment organs. Rod 55 is rigidly connected with milled knob 52 through a pin 59 extending through two diametrally opposed notches of said knob. This arrangement makes it possible to take up the wear. Advantageously, board 51 is provided with a pressure gauge which is connected during the trials with the pipes leading to the shock absorbers, which makes it possible to observe the variations of pressure.

Owing to this arrangement, the person who is to adjust the system can, from any point of the vehicle, the rear seat for instance, and while the vehicle is running, modify at will the strength of the return spring of the pressure relief device and the position of the stop that controls the opening of the discharge valve, thus modifying the shape of the oil pressure curve. The corresponding variations of the comfort and of the manner in which the running vehicle holds the road are easily observed, which makes it possible to very rapidly find the best position of adjustment. It then suffices to remove the adjustment device, to tighten nuts 21 and 6 and to fix the covers in position.

While I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A removable device for controlling from a distance the position of two nuts movable with a screwing movement parallelly to each other and wholly enclosed within a casing containing a fluid under pressure and provided with an aperture adapted to be closed by a closure element, which comprises, in combination, a support adapted to fit in a fluidtight manner on said aperture so as to stop it, two tubular members of respective inner cross sections corresponding in shape and size to the respective outer cross sections of said nuts adapted to fit around said nuts when said support is fixed in closing position on said aperture, and means for independently controlling from a distance from the outside the angular positions of said tubular members with respect to said support.

2. A removable device for controlling from a distance the position of two nuts movable with a screwing movement parallelly to each other and wholly enclosed within a casing containing a fluid under pressure and provided with an aperture adapted to be closed by a closure element, which comprises, in combination, a support adapted to fit in a fluidtight manner on said aperture so as to stop it, two tubular members of respective inner cross sections corresponding in shape and size to the respective outer cross sections of said nuts adapted to fit around said nuts when said support is fixed in closing position on said aperture, said tubular members being rotatably mounted in said support, helical pinions rigid with said tubular members, pinions journalled in said support and meshing with said helical pinions, and flexible shafts extending on the outside of said support for operating from a distance said second mentioned pinions.

LUCIEN SIMON.